United States Patent
Kobayashi et al.

(10) Patent No.: US 10,927,010 B2
(45) Date of Patent: Feb. 23, 2021

(54) ZEOLITE SEED CRYSTAL, METHOD OF PRODUCING ZEOLITE SEED CRYSTAL, METHOD OF PRODUCING ZEOLITE MEMBRANE COMPLEX, AND SEPARATION METHOD

(71) Applicant: NGK INSULATORS, LTD., Nagoya (JP)

(72) Inventors: Ko Kobayashi, Nagoya (JP); Ryotaro Yoshimura, Nagoya (JP); Kenichi Noda, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 16/819,608

(22) Filed: Mar. 16, 2020

(65) Prior Publication Data

US 2020/0308012 A1 Oct. 1, 2020

(30) Foreign Application Priority Data

Mar. 26, 2019 (JP) .............................. JP2019-058225

(51) Int. Cl.
*C01B 39/48* (2006.01)
*C01B 39/54* (2006.01)
(Continued)

(52) U.S. Cl.
CPC .............. *C01B 39/02* (2013.01); *B01J 20/08* (2013.01); *B01J 20/183* (2013.01); *C01B 37/02* (2013.01);
(Continued)

(58) Field of Classification Search
CPC ......... C01B 37/02; C01B 39/02; C01B 39/48; C01B 39/54; C01P 2002/72; C01P 2004/52; C01P 2006/12; B01J 20/08; B01J 20/183; B01J 20/28033; B01D 2253/104; B01D 2253/106; B01D 2253/108

See application file for complete search history.

(56) References Cited

U.S. PATENT DOCUMENTS

| 2012/0009120 A1 | 1/2012 | Cho et al. |
| 2016/0008771 A1 | 1/2016 | Yajima et al. |
(Continued)

FOREIGN PATENT DOCUMENTS

| JP | 2012-016688 A1 | 1/2012 |
| JP | 2012-045483 A1 | 3/2012 |
(Continued)

OTHER PUBLICATIONS

Sukanya, "The Effect of the Mutarotation Reaction on the Crystallization of Glucose Monohydrate", Suranaree University of Technology Academic Year 2005 (Year: 2005).*

*Primary Examiner* — David M Brunsman
(74) *Attorney, Agent, or Firm* — Burr & Brown, PLLC (57) ABSTRACT

A seed crystal is a crystal of zeolite that is to be deposited on a support when producing a zeolite membrane complex that includes the support and a zeolite membrane formed on the support. A volume-cumulative particle size distribution of the seed crystal, measured by a laser diffraction scattering method, has a coefficient of variation of 0.5 or less and a kurtosis of 5 or less. Use of these seed crystals improves the bonding of zeolite crystals when producing the zeolite membrane. As a result, a dense zeolite membrane can be formed.

14 Claims, 3 Drawing Sheets

(51) Int. Cl.
*C01B 37/02* (2006.01)
*C01B 39/02* (2006.01)
*B01J 20/18* (2006.01)
*B01J 20/08* (2006.01)

(52) U.S. Cl.
CPC .............. *C01B 39/48* (2013.01); *C01B 39/54* (2013.01); *C01P 2002/70* (2013.01); *C01P 2002/72* (2013.01); *C01P 2002/90* (2013.01); *C01P 2006/12* (2013.01)

(56) References Cited

U.S. PATENT DOCUMENTS

2017/0368509 A1 12/2017 Nagasaka et al.
2020/0024215 A1* 1/2020 Gao ........................ C07C 5/48

FOREIGN PATENT DOCUMENTS

JP 6301313 B2 3/2018
WO 2016/158583 A1 10/2016

* cited by examiner

FIG. 6

ZEOLITE SEED CRYSTAL, METHOD OF PRODUCING ZEOLITE SEED CRYSTAL, METHOD OF PRODUCING ZEOLITE MEMBRANE COMPLEX, AND SEPARATION METHOD

This application claims priority benefit under 35 U.S.C. Section 119 of Japanese Patent Application No. 2019-058225 filed in the Japan Patent Office on Mar. 26, 2019, the entire disclosure of which is incorporated herein by reference.

TECHNICAL FIELD

The present invention relates to zeolite seed crystals for use in producing a zeolite membrane complex.

BACKGROUND ART

Various studies and developments are currently underway on forming a zeolite membrane on a support to obtain a zeolite membrane complex and using the zeolite membrane complex in applications such as specific gas separation or molecular adsorption. When forming the zeolite membrane, for example, zeolite seed crystals are deposited on the support by immersing the support in a solution in which the seed crystals are dispersed. Then, hydrothermal synthesis or other processes are conducted while immersing the support with the seed crystals deposited thereon in a starting material solution. Accordingly, zeolite is grown using the seed crystals as nuclei, and a zeolite membrane is formed on the support.

Japanese Patent Application Laid-Open No. 2012-16688 (Document 1) discloses a technique for preparing seed crystal slurry through wet vibration pulverization and centrifugal separation of zeolite powder. International Publication WO 2016/158583 (Document 2) describes a technique for synthesizing seed crystals by hydrothermal synthesis of a starting material solution containing a nucleus that includes zeolite, silica, and a structure-directing agent. Japanese Patent Application Laid-Open No. 2012-45483 (Document 3) proposes to produce seed crystals having a particle size distribution of (D90-D10)/D50≤2.2 for the purpose of forming a dense zeolite membrane. Japanese Patent No. 6301313 (Document 4) discloses a technique for synthesizing seed crystals by hydrothermal synthesis and rinsing the seed crystals by centrifugal separation of a solution in which the seed crystals are dispersed and to which deionized water is added.

The seed crystals produced by pulverization according to Document 1 have low crystallinity. The seed crystals produced by pulverization also have a ceiling in improvement of classification accuracy because of a wide range of particle size distribution, and accordingly have difficulty in producing a dense zeolite membrane. The aforementioned mathematical expression of Document 3 defines a distribution of particle diameters from D10 to D90, but fails to consider particles having diameters of D10 or less and D90 or more. In other words, this mathematical expression does not consider the shape of the particle size distribution as a whole, and therefore has a ceiling in improvement of denseness of a zeolite membrane. Documents 2 and 4 mention nothing about the classification of seed crystals.

SUMMARY OF INVENTION

The present invention is directed to a zeolite seed crystal, and it is an object of the present invention to form a dense zeolite membrane.

A zeolite seed crystal according to a preferred embodiment of the present invention includes is to be deposited on a support when producing a zeolite membrane complex that includes the support and a zeolite membrane formed on the support. A volume-cumulative particle size distribution of the zeolite seed crystal, measured by a laser diffraction scattering method, has a coefficient of variation of 0.5 or less and a kurtosis of 5 or less. According to the present invention, it is possible to form a dense zeolite membrane.

Preferably, the coefficient of variation is 0.4 or less, and the kurtosis is 3 or less.

Preferably, in an X-ray diffraction pattern obtained by X-ray irradiation to the seed crystal, an intensity of a crystalline component at a diffraction angle 2θ at which a maximum peak appears within a range of the diffraction angle 2θ of 12° to 25° is 35 times or more an intensity of an amorphous component.

Preferably, the seed crystal has a specific surface area of 10 m$^2$/g or more and 150 m$^2$/g or less.

Preferably, the support is porous.

Preferably, a 50% diameter of the volume-cumulative particle size distribution is 1.1 times or more and 5 times or less a 50% diameter of a volume-cumulative pore size distribution of the support.

Preferably, the support is an alumina sintered compact or a mullite sintered compact.

The present invention is also directed to a method of producing a zeolite seed crystal. A method of producing a zeolite seed crystal according to a preferred embodiment of the present invention includes a) synthesizing an original crystal group of zeolite by hydrothermal synthesis and acquiring an intermediate crystal group from the original crystal group, and b) acquiring a crystal group as seed crystals from the intermediate crystal group, the crystal group being determined to have a volume-cumulative particle size distribution having a coefficient of variation of 0.5 or less and a kurtosis of 5 or less, the volume-cumulative particle size distribution being measured by a laser diffraction scattering method. According to the present invention, it is possible to form a dense zeolite membrane.

Preferably, in the operation b), the seed crystals are a crystal group extracted from the intermediate crystal group.

Preferably, in the operation b), the seed crystals are extracted by classification of the intermediate crystal group by centrifugal separation.

Preferably, the operation a) includes a1) synthesizing the original crystal group by hydrothermal synthesis, a2) pulverizing the original crystal group, and a3) acquiring the intermediate crystal group by recrystallization of the original crystal group pulverized in the operation a2).

The present invention is also directed to a method of producing a zeolite membrane complex. A method of producing a zeolite membrane complex according to a preferred embodiment of the present invention includes d) preparing a support, e) producing a seed-crystal-deposited support by depositing seed crystals produced by the method of producing a zeolite seed crystal according to claim 8 on the support, and f) immersing the seed-crystal-deposited support in a starting material solution and growing zeolite from the seed crystals by hydrothermal synthesis to form a zeolite membrane on the support.

The present invention is also directed to a separation method. A separation method according to a preferred embodiment of the present invention includes g) preparing a zeolite membrane complex produced by the method of producing a zeolite membrane complex according to claim 12, and h) supplying a mixture of substances including a plurality of types of gases or liquids to the zeolite membrane complex and allowing a high-permeability substance in the mixture of substances to permeate through the zeolite membrane complex to separate the high-permeability substance from other substances.

Preferably, the mixture of substances includes at least one of following substances: hydrogen, helium, nitrogen, oxygen, water, steam, carbon monoxides, carbon dioxides, nitrogen oxides, ammonia, sulfur oxides, hydrogen sulfides, sulfur fluorides, mercury, arsine, hydrocyanic acids, carbonyl sulfides, C1 to C8 hydrocarbons, organic acids, alcohol, mercaptans, ester, ether, ketone, and aldehyde.

These and other objects, features, aspects and advantages of the present invention will become more apparent from the following detailed description of the present invention when taken in conjunction with the accompanying drawings.

DESCRIPTION OF EMBODIMENTS

Figure 1:
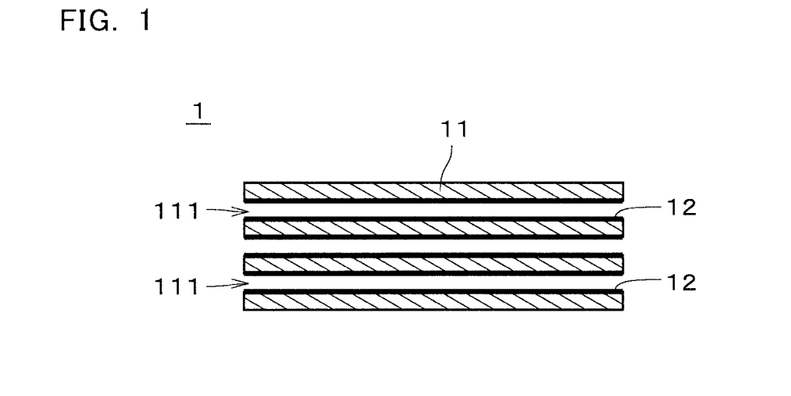
FIG. 1 is a sectional view of a zeolite membrane complex according to an embodiment.
Figure 2:
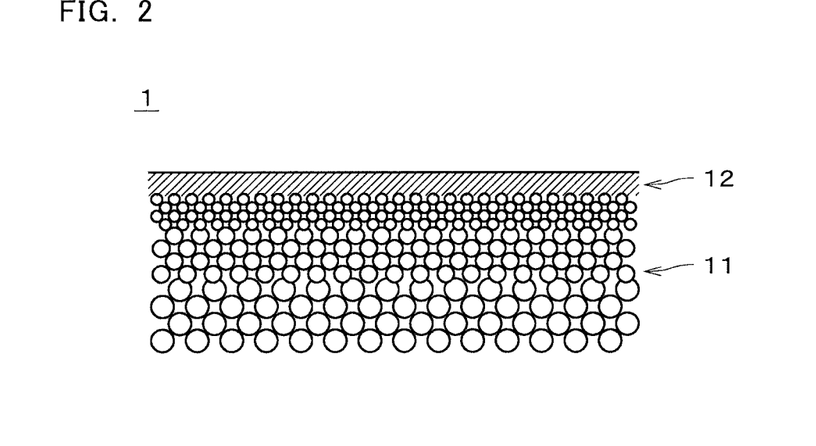
FIG. 2 is a sectional view illustrating part of the zeolite membrane complex in enlarge dimension.

FIG. 1 is a sectional view of a zeolite membrane complex 1 produced using seed crystals according to an embodiment of the present invention. FIG. 2 is a sectional view illustrating part of the zeolite membrane complex 1 in enlarged dimension. The zeolite membrane complex 1 includes a porous support 11 and a zeolite membrane 12 formed on the support 11. The zeolite membrane refers to at least a zeolite formed into a membrane on a surface of the support 11, and does not include zeolite particles that are merely dispersed in an organic membrane. The zeolite membrane 12 may include two or more types of zeolites having different structures and compositions. In FIG. 1, the zeolite membrane 12 is illustrated with a bold line. In FIG. 2, the zeolite membrane 12 is cross-hatched. In FIG. 2, the thickness of the zeolite membrane 12 is illustrated thicker than the actual thickness.

The support 11 is a porous member permeable to gases and liquids. In the example illustrated in FIG. 1, the support 11 is a monolith support obtained by forming a plurality of through holes 111, each extending in a longitudinal direction (i.e., an up-down direction in FIG. 1), in an integral columnar body that is molded integrally. In the example illustrated in FIG. 1, the support 11 has a substantially circular columnar shape. Each through hole 111 (i.e., cell) has, for example, a substantially circular section perpendicular to the longitudinal direction. In FIG. 1, the through holes 111 are illustrated as having a greater diameter than the actual diameter, and a smaller number of through holes 111 than the actual number is illustrated. The zeolite membrane 12 is formed on the inner surfaces of the through holes 111 and cover substantially the entire inner surfaces of the through holes 111.

The support 11 has a length (i.e., length in the right-left direction in FIG. 1) of, for example, 10 cm to 200 cm. The support 11 has an outer diameter of, for example, 0.5 cm to 30 cm. The distance between the central axes of each pair of adjacent through holes 111 is in the range of, for example, 0.3 mm to 10 mm. The surface roughness (Ra) of the support 11 is in the range of, for example, 0.1 μm to 5.0 μm and preferably in the range of 0.2 μm to 2.0 μm. Alternatively, the support 11 may have a different shape such as a honeycomb shape, a flat plate shape, a tubular shape, a circular cylindrical shape, a circular columnar shape, or a polygonal prism shape. When having a tubular shape or a circular cylindrical shape, the support 11 has a thickness of, for example, 0.1 mm to 10 mm.

Various substances (e.g., a ceramic or a metal) may be employed as the material for the support 11 as long as they have chemical stability in the step of forming the zeolite membrane 12 on the surface. In the present embodiment, the support 11 is formed of a ceramic sintered compact. Examples of the ceramic sintered compact to be selected as the material for the support 11 include alumina, silica, mullite, zirconia, titania, yttrium, silicon nitride, and silicon carbide. In the present embodiment, the support 11 contains at least one of alumina, silica, and mullite.

The support 11 may contain an inorganic binder. The inorganic binder may be at least one of titania, mullite, easily sinterable alumina, silica, glass frit, clay minerals, and easily sinterable cordierite.

The support 11 has a mean pore diameter of, for example, 0.01 μm to 70 μm and preferably 0.05 μm to 25 μm. A portion of the support 11 that is located in the vicinity of the surface where the zeolite membrane 12 is formed has a mean pore diameter of 0.01 μm to 1 μm, and preferably 0.05 μm to 0.5 μm. The mean pore diameters can be measured with, for example, a mercury porosimeter, a perm porosimeter, or a nan-perm porosimeter. As to a pore size distribution of the support 11 as a whole including the surface and inside of the support 11, D5 is in the range of, for example, 0.01 μm to 50 μm, D50 is in the range of, for example, 0.05 μm to 70 μm, and D95 is in the range of, for example, 0.1 μm to 2000 μm. The portion of the support 11 that is located in the vicinity of the surface where the zeolite membrane 12 is formed has a porosity of, for example, 20% to 60%.

The support 11 has, for example, a multilayer structure in which a plurality of layers having different mean pore diameters are laminated one above another in a thickness direction. A mean pore diameter and sintered particle diameter of a surface layer that includes the surface where the zeolite membrane 12 is formed are smaller than mean pore diameters and sintered particle diameters of other layers different from the surface layer. The surface layer of the support 11 has a mean pore diameter of, for example, 0.01 μm to 1 μm, and preferably 0.05 μm to 0.5 μm. When the support 11 has a multilayer structure, the material for each layer may be any of the materials described above. The materials for the plurality of layers, which form the multilayer structure, may be the same material, or may be different materials. Alternatively, the support 11 may be impermeable to gases and liquids (e.g., non-porous support).

The zeolite membrane 12 is a porous membrane having pores. The zeolite membrane 12 can be used as a separation membrane that uses a molecular sieving function to separate a specific substance from a mixture of substances obtained by mixing a plurality of types of substances. The zeolite membrane 12 is less permeable to other substances than to the specific substance. In other words, the amount by which the other substances permeate through the zeolite membrane 12 is smaller than the amount by which the aforementioned specific substance permeates through the zeolite membrane 12.

The zeolite membrane 12 has a thickness of, for example, 0.05 μm to 30 μm, preferably 0.1 μm to 20 μm, and more preferably 0.5 μm to 10 μm. Separation performance improves as the thickness of the zeolite membrane 12 increases. The rate of permeation increases as the thickness of the zeolite membrane 12 decreases. The surface roughness (Ra) of the zeolite membrane 12 is, for example, 5 μm or less, preferably 2 μm or less, more preferably 1 μm or less, and yet more preferably 0.5 μm or less.

The zeolite membrane 12 has a pore diameter of, for example, greater than or equal to 0.2 nm and less than 0.4 nm, and preferably greater than or equal to 0.3 nm and less than 0.4 nm. When the zeolite membrane 12 has a pore diameter of less than 0.2 nm, the amount of gas permeation through the zeolite membrane may decrease, and when the zeolite membrane 12 has a pore diameter of greater than or equal to 0.4 nm, the zeolite membrane may have insufficient selectivity. The pore diameter of the zeolite membrane 12 refers to a diameter (i.e., minor axis) of a pore in a direction substantially perpendicular to a maximum diameter (i.e., a maximum value of the distance between oxygen atoms) of a pore in the zeolite that makes up the zeolite membrane 12. When n is defined as a maximum number of members in the ring of the zeolite that makes up the zeolite membrane 12, the minor axis of an n-membered ring pore is defined as the pore diameter of the zeolite membrane 12. When the zeolite has a plurality of types of n-membered ring pores where n is the same number, the minor axis of an n-membered ring pore that has a largest minor axis is defined as the pore diameter of the zeolite membrane 12. The pore diameter of the zeolite membrane 12 is smaller than the mean pore diameter of the surface of the support 11 where the zeolite membrane 12 is formed.

Note that an n-membered ring refers to a ring in which n oxygen atoms constitute a framework of a pore and each oxygen atom and a T atom described later are bonded together to form a ring structure. An n-membered ring also refers to a ring that forms a through hole (channel), and does not include a ring that fails to form a through hole. An n-membered ring pore refers to a pore formed by an n-membered ring.

The pore diameter of the zeolite membrane is uniquely determined by the framework structure of the zeolite and obtained from a value presented in the "Database of Zeolite Structures," [online] by the International Zeolite Association on the Internet (URL:http://www.iza-structure.org/databases/).

The type of the zeolite, which makes up the zeolite membrane 12, is not particularly limited, and the zeolite may, for example, be any of the followings: AEI type, AEN type, AFN type, AFV type, AFX type, BEA type, CHA type, DDR type, ERI type, ETL type, FAU type (X type, Y type), GIS type, LEV type, LTA type, MEL type, MFI type, MOR type, PAU type, RHO type, SAT type, and SOD type. More preferably, the zeolite may, for example, be any of the followings: AEI type, AFN type, AFV type, AFX type, CHA type, DDR type, ERI type, ETL type, GIS type, LEV type, LTA type, PAU type, RHO type, and SAT type. Yet more preferably, the zeolite may, for example, be any of the followings: AEI type, AFN type, AFV type, AFX type, CHA type, DDR type, ERI type, ETL type, GIS type, LEV type, PAU type, RHO type, and SAT type.

The zeolite that makes up the zeolite membrane 12 contains, for example, aluminum (Al) as T atoms. The zeolite making up the zeolite membrane 12 may, for example, be a zeolite in which atoms (T atoms) located in the center of an oxygen tetrahedron ($TO_4$) of zeolite are composed of silicon (Si) and Al; an AlPO-type zeolite in which T atoms are composed of Al and phosphorus (P); an SAPO-type zeolite in which T atoms are composed of Si, Al, and P; an MAPSO-type zeolite in which T atoms are composed of magnesium (Mg), Si, Al, and P; or a ZnAPSO-type zeolite in which T atoms are composed of zinc (Zn), Si, Al, and P. Some of the T atoms may be replaced by other elements.

The zeolite membrane 12 contains, for example, Si. For example, the zeolite membrane 12 may contain any two or more of Si, Al, and P. The zeolite membrane 12 may contain alkali metal. The alkali metal is, for example, sodium (Na) or potassium (K). When the zeolite membrane 12 contains Si atoms and Al atoms, the Si/Al ratio in the zeolite membrane 12 is, for example, one or more and a hundred thousand or less. The Si/Al ratio is a molar ratio of Si elements to Al elements contained in the zeolite membrane 12. The Si/Al ratio is preferably 5 or more, more preferably 20 or more, and yet more preferably 100 or more, and is preferably as high as possible. The Si/Al ratio in the zeolite membrane 12 may be adjusted by, for example, adjusting the composition ratio of an Si source and an Al source in a starting material solution described later.

From the viewpoint of increasing the amount of $CO_2$ permeation and improving separation performance, a maximum number of members in the ring of the zeolite contained in the zeolite membrane 12 is preferably 8 or less (e.g., 6 or 8). The zeolite membrane 12 is, for example, an SAT-type zeolite. In other words, the zeolite membrane 12 is composed of zeolite having a framework type code "SAT" assigned by the International Zeolite Association. In this case, the zeolite of the zeolite membrane 12 has an intrinsic pore diameter of 0.30 nm×0.55 nm.

The amount of $CO_2$ permeation (permeance) through the zeolite membrane 12 at a temperature of 20° C. to 400° C. is, for example, 100 nmol/m$^2$·s·Pa or more. The ratio (permeance ratio) of $CO_2$ permeation and $CH_4$ leakage in the zeolite membrane 12 at a temperature of 20° C. to 400° C. is, for example, 100 or higher. The permeance and the permeance ratio are those for the case where a difference in partial pressure of $CO_2$ between the supply and permeation sides of the zeolite membrane 12 is 1.5 MPa.

Figure 3:
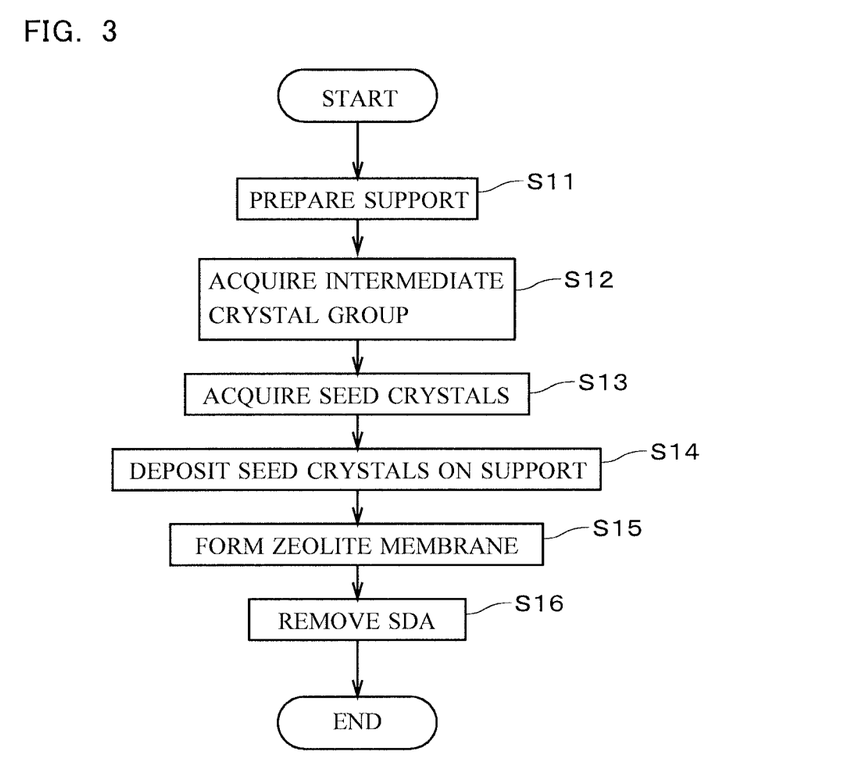
FIG. 3 is a flowchart of production of the zeolite membrane complex.

Next, an example of the procedure for producing the zeolite membrane complex 1 will be described with reference to FIGS. 3 and 4. In the production of the zeolite membrane complex 1, first, the aforementioned porous support 11 is prepared (FIG. 3: step S11). Then, seed crystals are produced by a production method illustrated in steps S12 and S13 described later. The production of seed crystals may be performed in parallel with step S11 or before step S11.

Figure 4:
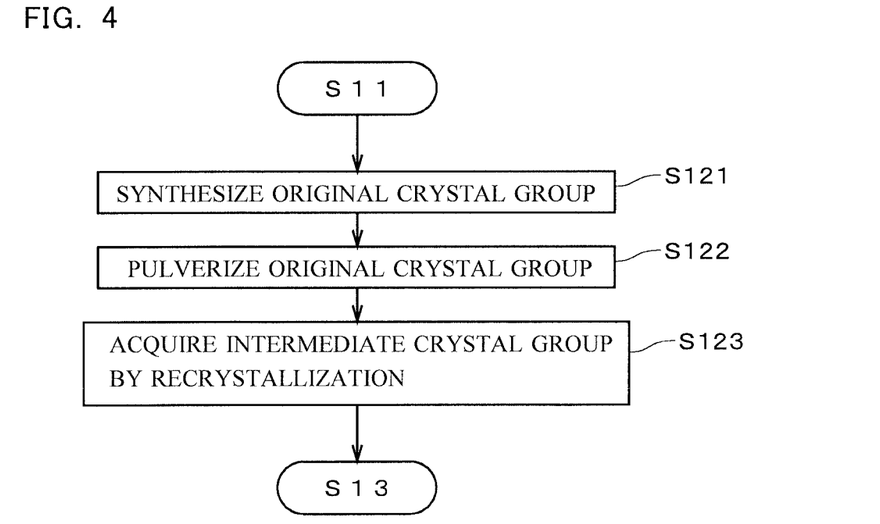
FIG. 4 is a flowchart of production of the zeolite membrane complex.

In the production of seed crystals, first, an original crystal group of zeolite is synthesized by hydrothermal synthesis, and an intermediate crystal group is acquired from the original crystal group (step S12). FIG. 4 illustrates an example of a detailed procedure of step S12. In the example illustrated in FIG. 4, first, the original crystal group of zeolite is synthesized by hydrothermal synthesis (step S121). The original crystal group contains any two or more of Si, Al, and P, or contains Si. In the present embodiment, the original crystal group is an AlPO-based SAT-type zeolite that contains at least Al, P, and O. In step S121, for example, an aluminum hydroxide, an aluminum alkoxide, or an alumina sol is used as an aluminum source in the hydrothermal synthesis.

Then, the original crystal group is rinsed with deionized water or the like, dried, and then pulverized for a predetermined period of time (e.g., 2 to 7 days) (step S122). In step S122, the original crystal group is pulverized by, for example, wet pulverization in a ball mill or a bead mill.

Next, the original crystal group pulverized in step S122 is recrystallized by hydrothermal synthesis to acquire an intermediate crystal group (step S123). The intermediate crystal group is rinsed with deionized water or the like. Like the original crystal group, the intermediate crystal group is an AlPO-based SAT-type zeolite. In step S123, for example, an aluminum hydroxide, an aluminum alkoxide, or an alumina sol is used as an aluminum source in the hydrothermal synthesis. In this way, the intermediate crystal group with high crystallinity and high uniformity in particle diameter can be obtained.

When the intermediate crystal group has been acquired in step S12, seed crystals are acquired from the intermediate crystal group (step S13). The seed crystals are a crystal group determined to have a volume-cumulative particle size distribution having a coefficient of variation of 0.5 or less and a kurtosis of 5 or less, the volume-cumulative particle size distribution being measured by a laser diffraction scattering method. In step S13, the intermediate crystal group as a whole obtained in step S12 may be acquired as seed crystals, or a crystal group extracted from the intermediate crystal group obtained in step S12 may be acquired as seed crystals.

The measurement of the volume-cumulative particle size distribution of seed crystals by the laser diffraction scattering method is conducted using Nanotrac UPA-EX150 manufactured by Nikkiso Co., Ltd. The principle of measurement that the measuring apparatus is based on is dynamic light scattering, and the measuring range is from 0.0008 µm to 6.5406 µm. As a light source, a semiconductor laser with a wavelength of 780 nm and an output of 3 mW is used. The same applies to examples and comparative examples described below.

The aforementioned coefficient of variation $C_V$ is obtained by Expressions 1 and 2 below, using the frequency of particles at each particle diameter, obtained from the volume-cumulative particle size distribution. The kurtosis v is obtained by Expression 3 below. The kurtosis v is an index indicating the degree of spread at the base of the volume-cumulative particle size distribution of the seed crystals. As the kurtosis v decreases, a less number of particles has particle diameters that deviate considerably from the mean particle diameter. Expression 3 obtains the kurtosis v of the volume-cumulative particle size distribution of the seed crystals, assuming that the normal distribution has a kurtosis of 3. In Expressions 1 to 3, $x_{ave}$ denotes the mean particle diameter (µm), and σ denotes the standard deviation. Also, $x_i$ denotes the i-th particle diameter (µm), and N is a positive integer greater than or equal to 2.

$$C_V = \frac{\sigma}{x_{ave}} \quad \text{Expression 1}$$

$$\sigma = \sqrt{\frac{1}{N-1} \sum_{i=1}^{N} (x_i - x_{ave})^2} \quad \text{Expression 2}$$

$$v = \sum_{i=1}^{N} \frac{(x_i - x_{ave})^4}{N\sigma^4} \quad \text{Expression 3}$$

In step S13, for example, the aforementioned measurement by the laser diffraction scattering method is conducted on the intermediate crystal group acquired in step S12 to acquire a volume-cumulative particle size distribution. When the volume-cumulative particle size distribution has a coefficient of variation of 0.5 or less and a kurtosis of 5 or less, the intermediate crystal group as a whole obtained in step S12 is acquired as seed crystals. On the other hand, when the aforementioned volume-cumulative particle size distribution has a coefficient of variation of higher than 0.5 or a kurtosis of greater than 5, part of the intermediate crystal group acquired in step S12 is extracted so as to achieve a coefficient of variation of 0.5 or less and a kurtosis of 5 or less, and this part of the intermediate crystal group is acquired as seed crystals. Like the original crystal group and the intermediate crystal group, the seed crystals acquired in step S13 are AlPO-based SAT-type zeolite seed crystals.

The extraction of seed crystals from the intermediate crystal group is implemented by, for example, classification of the intermediate crystal group by centrifugal separation. Specifically, a liquid obtained by dispersing the intermediate crystal group in deionized water or the like is subjected to centrifugal separation using a centrifugal separator under predetermined conditions, so as to recover a suspension in the upper portion (i.e., in the vicinity of the water surface) or lower portion (i.e., in the vicinity of the bottom of a case) of the liquid that has undergone the centrifugal separation. When the centrifugal separation is conducted multiple times, a liquid prepared by adding deionized water or the like to the recovered suspension is subjected to centrifugal separation under similar conditions. In step S13, it is preferable that the measurement by the laser diffraction scattering method is conducted on the extracted seed crystals so as to confirm that the acquired volume-cumulative particle size distribution has a coefficient of variation of 0.5 or less and a kurtosis of 5 or less.

Alternatively, in step S13, the aforementioned classification of the intermediate crystal group may be conducted to extract seed crystals without conducting the measurement by the laser diffraction scattering method on the intermediate crystal group. Even in this case, it is preferable that the measurement by the laser diffraction scattering method is conducted on the extracted seed crystals so as to confirm that the acquired volume-cumulative particle size distribution has a coefficient of variation of 0.5 or less and a kurtosis of 5 or less.

The extraction of seed crystals from the intermediate crystal group in step S13 does not necessarily have to be implemented by the classification through centrifugal separation. For example, a liquid prepared by pouring the intermediate crystal group acquired in step S12 into deionized water or the like may be left at rest, and a difference in sedimentation velocity caused by a difference in particle diameter may be used to extract part of the intermediate crystal group as seed crystals.

The above volume-cumulative particle size distribution of the seed crystals acquired in step S13 preferably has a coefficient of variation of 0.4 or less and a kurtosis of 3 or less. Also, the 50% diameter of the volume-cumulative particle size distribution (i.e., a particle diameter at 50% of the volume-cumulative particle size distribution; so-called D50) is preferably 1.1 times or more and 5 times or less the 50% diameter of the volume-cumulative pore size distribution of the support 11. The volume-cumulative pore size distribution of the support 11 is a volume-cumulative pore size distribution of a portion of the support 11 in the vicinity of the surface where the zeolite membrane 12 is formed. The volume-cumulative pore size distribution of the support 11 is measured with an "Automated Perm Porosimeter," which is a porous-material automatic pore diameter distribution measuring system manufactured by Porous Materials, Inc., using Fluorinert (with a surface tension of 16 dynes/cm) manufactured by 3M as a reagent. The above measuring system conducts measurements based on a bubble point method (ASTM F316-86, JIS K 3832).

The seed crystals acquired in step S13 have a specific surface area of, for example, 10 m$^2$/g or more and 150 m$^2$/g or less. The specific surface area of the seed crystals is obtained by the BET1 point method. The seed crystals have a tap density of, for example, 0.2 g/cm$^3$ to 1.0 g/cm$^3$. Accordingly, the seed crystals can be deposited densely on the support 11 in step S14, which will be described later. Note that the tap density is measured by JIS R 1628.

In an X-ray diffraction pattern obtained by X-ray irradiation to the seed crystals, the intensity of crystalline components at a diffraction angle 2θ at which a maximum peak appears within a range of the diffraction angle 2θ of 12° to 25° (i.e., peak intensity) is, for example, 35 times or more the intensity of amorphous components. Preferably, the ratio of the intensity of the crystalline component to the intensity of the amorphous component is 40 times or more. An upper-limit value of the ratio is not particularly limited, but it may, for example, be 1000 times or less and preferably 600 times or less. Zeolite crystals are known to have intense diffraction peaks within the range of the diffraction angle 2θ of 12° to 25° depending on their crystal structure. Thus, maximum peaks within the range of the diffraction angle 2θ of 12° to 25° are targeted for use in the evaluation of the crystalline components and the amorphous components.

The X-rays used in the X-ray diffraction are CuKα rays. The X-ray output is 600 W. Quantitative evaluation of the crystalline components and the amorphous components is made possible by defining the type and output of X-rays. The X-ray diffraction is conducted at a tube voltage of 40 kV, a tube current of 15 mA, and a scanning speed of 5°/min and with a scanning step of 0.02°. A scintillation counter is used as a detector. The X-ray diffraction is conducted using a divergence slit of 1.25°, a scatter slit of 1.25°, a receiving slit of 0.3 mm, an incident solar slit of 5.0°, and a receiving solar slit of 5.0°. As an CuKβ-ray filter, a 0.015-mm-thick nickel foil is used, without using a monochromator. For example, the measurement of the X-ray diffraction pattern may use MiniFlex600 manufactured by Rigaku Corporation. Also, the measurement of the X-ray diffraction pattern is conducted by densely filling a sufficiently deep sample holder with measurement powder.

The intensity of amorphous components refers to the baseline in the X-ray diffraction pattern, i.e., the height of background noise components. The intensity of crystalline components refers to a height obtained by excluding a height that indicates the intensity of amorphous components in the X-ray diffraction pattern. The aforementioned baseline in the X-ray diffraction pattern is obtained by, for example, the Sonneveld-Visser method or a spline interpolation method.

When the seed crystals have been acquired in step S13, the seed crystals are deposited on the support 11 to produce a seed-crystal-deposited support (step S14). The deposition of the seed crystals on the support 11 is implemented by, for example, immersing the support 11 in a solution in which the seed crystals are dispersed. Specifically, the support 11 in a position where the longitudinal direction is substantially parallel to the direction of gravity is immersed in a solution in which the seed crystals are dispersed. That is, the inner side surface of each through hole 111 is a substantially vertical surface substantially parallel to the direction of gravity (i.e., a surface whose normal substantially faces in the horizontal direction). Each through hole 111 is filled with the aforementioned solution in which the seed crystals are dispersed. Then, the solution in each through hole 111 is drawn in by suction from the inner side surface of the through hole 111 into the support 11. The seed crystals in the solution remain on the inner side surface of each through hole 111 and are deposited on the inner side surface without permeating through the support 11. Note that the method of depositing the seed crystals on the support 11 may be modified in various ways.

The support 11 with the seed crystals deposited thereon in step S14 (i.e., seed-crystal-deposited support) is immersed in a starting material solution. Then, the zeolite membrane 12 is formed on the support 11 by growing zeolite by hydrothermal synthesis using the seed crystals as nuclei (step S15). The temperature of the hydrothermal synthesis is preferably in the range of 110° C. to 200° C. At this time, an oriented zeolite membrane 12 can be obtained by adjusting the composition ratio or the like of an aluminum source, a phosphorus source, and a structure-directing agent (hereinafter, also referred to as an "SDA") in the starting material solution. Thereafter, the SDA in the zeolite membrane 12 is decomposed and removed by heating so as to obtain the zeolite membrane complex 1 (step S16). In step S16, the SDA in the zeolite membrane 12 may be removed totally, or may be left in part.

Figure 5:
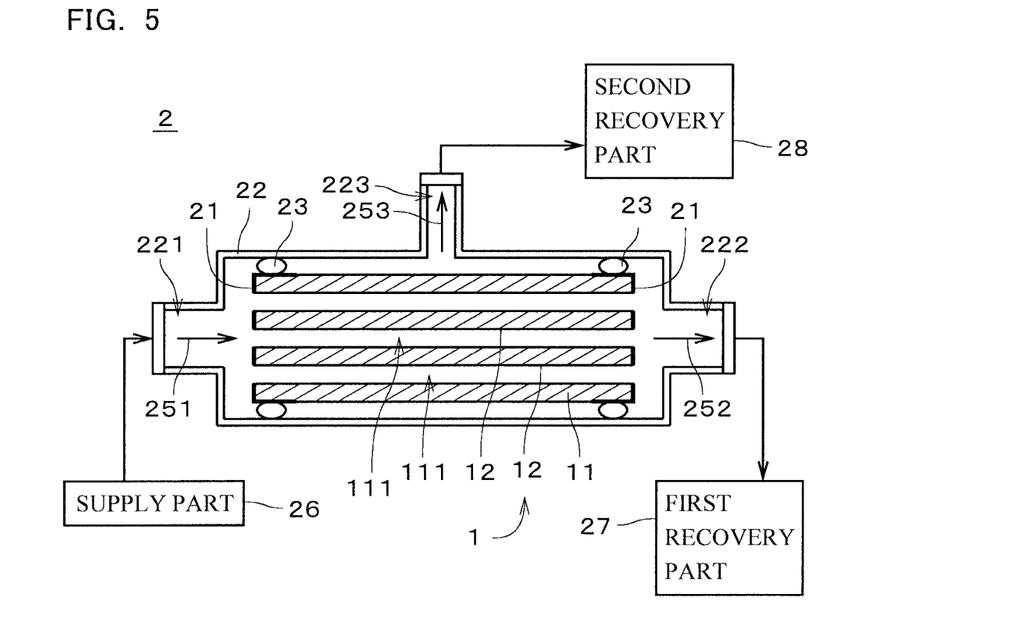
FIG. 5 illustrates an apparatus for separating a mixture of substances.
Figure 6:
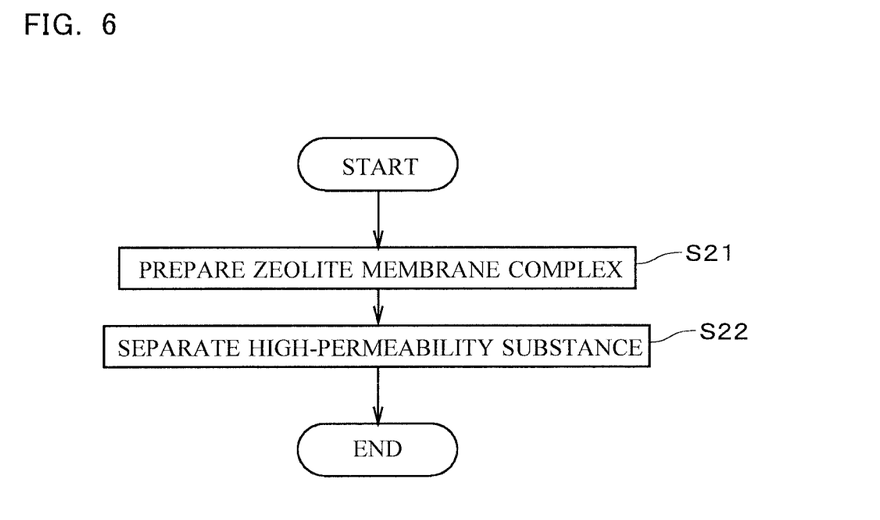
FIG. 6 is a flowchart of separation of the mixture of substances.

Next, separation of a mixture of substances using the zeolite membrane complex 1 will be described with reference to FIGS. 5 and 6. FIG. 5 illustrates a separator 2. FIG. 6 is a flowchart of the separation of the mixture of substances, performed by the separator 2.

The separator 2 supplies a mixture of substances including a plurality of types of fluids (i.e., gases or liquids) to the zeolite membrane complex 1 and allowing a substance with high permeability in the mixture of substances to permeate through the zeolite membrane complex 1 so as to separate that substance from the mixture of substances. The separator 2 may make a separation for the purpose of extracting a substance with high permeability from the mixture of substances or for the purpose of concentrating a substance with low permeability.

The mixture of substances (i.e., mixed fluid) may be a mixed gas containing a plurality of types of gases, or a mixed solution containing a plurality of types of liquids, or a gas-liquid two-phase fluid containing both gases and liquids.

The mixture of substances includes, for example, one or more types of the following substances: hydrogen ($H_2$), helium (He), nitrogen ($N_2$), oxygen ($O_2$), water ($H_2O$), steam ($H_2O$), carbon monoxides (CO), carbon dioxides ($CO_2$), nitrogen oxides, ammonia ($NH_3$), sulfur oxides, hydrogen sulfides ($H_2S$), sulfur fluorides, mercury (Hg), arsine ($AsH_3$), hydrocyanic acids (HCN), carbonyl sulfides (COS), C1 to C8 hydrocarbons, organic acids, alcohol, mercaptans, ester, ether, ketone, and aldehyde.

Nitrogen oxides are compounds of nitrogen and oxygen. The aforementioned nitrogen oxides are, for example, gases called $NO_X$ (NOX) such as nitrogen monoxides (NO), nitrogen dioxides ($NO_2$), nitrous oxides (also referred to as dinitrogen monoxides) ($N_2O$), dinitrogen trioxides ($N_2O_3$), dinitrogen tetroxides ($N_2O_4$), and dinitrogen pentoxides ($N_2O_5$).

Sulfur oxides are compounds of sulfur and oxygen. The aforementioned sulfur oxides are, for example, gases called $SO_X$ (SOX) such as sulfur dioxides ($SO_2$) and sulfur trioxides ($SO_3$).

Sulfur fluorides are compounds of fluorine and sulfur. Examples of the aforementioned sulfur fluorides include disulfur difluorides (F—S—S—F, S=$SF_2$), sulfur difluorides ($SF_2$), sulfur tetrafluorides ($SF_4$), sulfur hexafluorides ($SF_6$), and disulfur decafluorides ($S_2F_{10}$).

C1 to C8 hydrocarbons are hydrocarbons containing one or more and eight or less carbon atoms. C3 to C8 hydrocarbons may be any of linear-chain compounds, side-chain compounds, and cyclic compounds. C3 to C8 hydrocarbons may also be either saturated hydrocarbons (i.e., the absence of double bonds and triple bonds in molecules) or unsaturated hydrocarbons (i.e., the presence of double bonds and/or triple bonds in molecules). Examples of C1 to C4 hydrocarbons include methane ($CH_4$), ethane ($C_2H_6$), ethylene ($C_2H_4$), propane ($C_3H_8$), propylene ($C_3H_6$), normal butane ($CH_3(CH_2)_2CH_3$), isobutane ($CH(CH_3)_3$), 1-butene ($CH_2$=$CHCH_2CH_3$), 2-butene ($CH_3CH$=$CHCH_3$), and isobutene ($CH_2$=$C(CH_3)_2$).

The aforementioned organic acids are, for example, carboxylic acids or sulfonic acids. Examples of the carboxylic acids include formic acids ($CH_2O_2$), acetic acids ($C_2H_4O_2$), oxalic acids ($C_2H_2O_4$), acrylic acids ($C_3H_4O_2$), and benzoic acids ($C_6H_5COOH$). The sulfonic acids are, for example, ethane sulfonic acids ($C_2H_6O_3S$). The organic acids may be either chain compounds or cyclic compounds.

Examples of the aforementioned alcohol include methanol ($CH_3OH$), ethanol ($C_2H_5OH$), isopropanol (2-propanol) ($CH_3CH(OH)CH_3$), ethylene glycol ($CH_2(OH)CH_2(OH)$), and butanol ($C_4H_9OH$).

The mercaptans are organic compounds with hydrogenerated sulfur (SH) at their terminals and are substances called also thiol or thioalcohol. Examples of the aforementioned mercaptans include methyl mercaptans ($CH_3SH$), ethyl mercaptans ($C_2H_5SH$), and 1-propane thiols ($C_3H_7SH$).

Examples of the aforementioned ester include formic acid ester and acetic acid ester.

Examples of the aforementioned ether include dimethyl ether (($CH_3)_2O$), methyl ethyl ether ($C_2H_5OCH_3$), and diethyl ether (($C_2H_5)_2O$).

Examples of the aforementioned ketone include acetone (($CH_3)_2CO$), methyl ethyl ketone ($C_2H_5COCH_3$), and diethyl ketone (($C_2H_5)_2CO$).

Examples of the aforementioned aldehyde include acetaldehyde ($CH_3CHO$), propionaldehyde ($C_2H_5CHO$), and butanal (butyraldehyde) ($C_3H_7CHO$).

The following description takes the example of the case where the mixture of substances to be separated by the separator 2 is a mixed gas including a plurality of types of gases.

The separator 2 includes the zeolite membrane complex 1, a sealing part 21, an outer casing 22, two seal members 23, a supply part 26, a first recovery part 27, and a second recovery part 28. The zeolite membrane complex 1, the sealing part 21, and the seal members 23 are housed in the outer casing 22. The supply part 26, the first recovery part 27, and the second recovery part 28 are disposed outside the outer casing 22 and connected to the outer casing 22.

The sealing part 21 is a member mounted on the opposite ends of the support 11 in the longitudinal direction (i.e., left-right direction in FIG. 5) and for covering and sealing the opposite end faces of the support 11 in the longitudinal direction and the outer side surfaces in the vicinity of the opposite end faces. The sealing part 21 prevents the inflow and outflow of gases through the opposite end faces of the support 11. The sealing part 21 is, for example, a plate-like member formed of glass or a resin. The material and shape of the sealing part 21 may be appropriately changed. Since the sealing part 21 has a plurality of openings that overlap the through holes 111 of the support 11, the opposite ends of each through hole 111 of the support 11 in the longitudinal direction are not covered by the sealing part 21. This allows the inflow and outflow of gases or the like from these opposite ends into the through holes 111.

The outer casing 22 is a tubular member of a substantially circular cylindrical shape. The outer casing 22 is formed of, for example, stainless steel or carbon steel. The longitudinal direction of the outer casing 22 is substantially parallel to the longitudinal direction of the zeolite membrane complex 1. One end of the outer casing 22 in the longitudinal direction (i.e., left-side end in FIG. 5) has a supply port 221, and the other end thereof has a first exhaust port 222. A side surface of the outer casing 22 has a second exhaust port 223. The supply port 221 is connected to the supply part 26. The first exhaust port 222 is connected to the first recovery part 27. The second exhaust port 223 is connected to the second recovery part 28. The internal space of the outer casing 22 is an enclosed space isolated from the space around the outer casing 22.

The two seal members 23 are disposed around the entire circumference between the outer face of the zeolite membrane complex 1 and the inner face of the outer casing 22 in the vicinity of the opposite ends of the zeolite membrane complex 1 in the longitudinal direction. Each seal member 23 is a substantially circular ring-shaped member formed of a material impermeable to gases. For example, the seal members 23 are O rings formed of a resin having flexibility. The seal members 23 are in intimate contact with the outer face of the zeolite membrane complex 1 and the inner face of the outer casing 22 around the entire circumference. In the example illustrated in FIG. 5, the seal members 23 are in intimate contact with the outer face of the sealing part 21 and are indirectly in intimate contact with the outer face of the zeolite membrane complex 1 via the sealing part 21. The space between the seal member 23 and the outer surface of the zeolite membrane complex 1 and the space between the seal member 23 and the inner face of the outer casing 22 are sealed so as to almost or completely disable the passage of gases.

The supply part 26 supplies a mixed gas to the internal space of the outer casing 22 through the supply port 221. For example, the supply part 26 is a blower or pump that transmits the mixed gas toward the outer casing 22 under pressure. The blower or pump includes a pressure regulator that regulates the pressure of the mixed gas supplied to the outer casing 22. The first recovery part 27 and the second recovery part 28 are, for example, reservoirs that store gases derived from the outer casing 22, or blowers or pumps that transmit gases.

In the separation of a mixed gas, the aforementioned separator 2 is provided to prepare the zeolite membrane complex 1 (FIG. 6: step S21). Then, a mixed gas including a plurality of types of gases having different permeability to the zeolite membrane 12 is supplied from the supply part 26 to the internal space of the outer casing 22. For example, the mixed gas is composed predominantly of $CO_2$ and $CH_4$. The mixed gas may also contain other gases different from $CO_2$ and $CH_4$. The pressure (i.e., supply pressure) of the mixed gas supplied from the supply part 26 to the internal space of the outer casing 22 is in the range of, for example, 0.1 MPa to 20.0 MPa. The temperature of separating the mixed gas is in the range of, for example, 10° C. to 200° C.

The mixed gas supplied from the supply part 26 to the outer casing 22 is introduced from the left end of the zeolite membrane complex 1 in the drawing into each through hole 111 of the support 11 as indicated by an arrow 251. A gas having high permeability (e.g., $CO_2$; hereinafter referred to as a "high-permeability substance") in the mixed gas permeates through the zeolite membrane 12 provided on the inner surface of each through hole 111 and the support 11, and is emitted from the outer side surface of the support 11. In this way, high-permeability substances are separated from gases having low permeability (e.g., $CH_4$; hereinafter referred to as "low-permeability substances") in the mixed gas (step S22). A gas (hereinafter referred to as a "permeable substance") emitted from the outer side surface of the support 11 is recovered by the second recovery part 28 through the second exhaust port 223 as indicated by an arrow 253. The pressure (i.e., permeation pressure) of the gas recovered by the second recovery part 28 through the second exhaust port 223 is, for example, approximately one atmospheric pressure (0.101 MPa).

In the mixed gas, gases (hereinafter, referred to as "impermeable substances") other than the gases that have permeated through the zeolite membrane 12 and the support 11 pass through each through hole 111 of the support 11 from the left side to the right side in the drawing and is recovered by the first recovery part 27 through the first exhaust port 222 as indicated by an arrow 252. The pressure of the gases recovered by the first recovery part 27 through the first exhaust port 222 is, for example, substantially the same pressure as the supply pressure. In addition to the aforementioned low-permeability substances, the impermeable substances may also include high-permeability substances that did not permeate through the zeolite membrane 12.

Next description is given of a relationship between the coefficient of variation and kurtosis of the volume-cumulative particle size distribution of seed crystals and the separation performance of the zeolite membrane complex 1 produced from the seed crystals. In the aforementioned separator 2, separation performance is determined by a permeated substance (i.e., permeated gas) that has permeated through the zeolite membrane complex 1 and has been recovered by the second recovery part 28 after the supply of the mixed gas of $CO_2$ and $CH_4$ from the supply part 26 to the zeolite membrane complex 1 in the outer casing 22. Specifically, separation performance is a value (i.e., permeance ratio of $CO_2$ and $CH_4$) obtained by dividing the amount of $CO_2$ permeation recovered by the second recovery part 28 by the amount of $CH_4$ leakage recovered by the second recovery part 28. The volume fractions of $CO_2$ and $CH_4$ in the mixed gas supplied from the supply part 26 are both assumed to be 50%, and the partial pressures of $CO_2$ and $CH_4$ are both assumed to be 0.3 MPa.

In Example 1, seed crystals were prepared as follows. First, a starting material solution was prepared by dissolving aluminum isopropoxide, 85% phosphoric acid, and 1,4-diazabicyclo [2,2,2]otane-C4-diquat hydroxide respectively as an aluminum source, a phosphorus source, and an SDA in deionized water. The starting material solution had a composition of $1Al_2O_3:1P_2O_5:0.8SDA:200H_2O$. The starting material solution was then subjected to hydrothermal synthesis at 190° C. for 50 hours. Then, an original crystal group obtained by the hydrothermal synthesis was recovered and rinsed sufficiently with deionized water, and then dried completely at 65° C.

Next, the original crystal group was poured in deionized water so as to achieve 10 to 20% by mass and pulverized in a ball mill for two days. The pulverized original crystal group (i.e., pulverized crystal group) was then poured in the starting material solution (i.e., synthesis sol) having a composition of $1Al_2O_3:2P_2O_5:2.3SDA:1000H_2O$ and recrystallized by hydrothermal synthesis to acquire an intermediate crystal group. The hydrothermal synthesis for recrystallization was conducted at 170° C. for 30 hours.

Thereafter, a liquid prepared by pouring the intermediate crystal group in deionized water so as to achieve 1 to 10% by mass was subjected to centrifugal separation at 2000 rpm for 20 minutes using a centrifugal separator (CT6EL: a bench centrifugal machine manufactured by Koki Holdings Co., Ltd.) to recover a suspension in the upper portion (i.e., in the vicinity of the surface) of the liquid that had undergone the centrifugal separation. A liquid obtained by conducting the centrifugal separation and the recovery of the suspension twice was dried at 80° C. for 24 hours, and recovered seed crystals were subjected to X-ray diffraction measurement.

The volume-cumulative particle size distribution of the seed crystals in Example 1 had a coefficient of variation of 0.37 and a kurtosis of 1.97. That is, the volume-cumulative particle size distribution of the seed crystals in Example 1 had a coefficient of variation of 0.5 or less and a kurtosis of 5 or less.

In Example 1, the zeolite membrane 12 was produced as follows. First, the support 11 was put in contact with a solution in which the aforementioned seed crystals were dispersed, so as to deposit the seed crystals on the inner surface of each through hole 111. Then, a starting material solution was prepared by dissolving aluminum isopropoxide, 85% phosphoric acid, and 1,4-diazabicyclo[2,2,2]otane-C4-diquat hydroxide respectively as an aluminum source, a phosphorus source, and an SDA in deionized water. The starting material solution had a composition of $1Al_2O_3:2P_2O_5:2.3SDA:1000H_2O.$ Then, the support 11 with the seed crystals deposited thereon was immersed in the starting material solution and subjected to hydrothermal synthesis at 170° C. for 30 hours so as to form the zeolite membrane 12 on the support 11. The support 11 with the zeolite membrane 12 formed thereon was then rinsed sufficiently with deionized water and dried completely at 100° C. Next, the zeolite membrane complex 1 was obtained by heating the support 11 with the zeolite membrane 12 formed thereon at 500° C. for 50 hours so as to burn and remove the SDA and penetrate pores in the zeolite membrane 12.

Example 2 used seed crystals obtained in the same manner as in Example 1, except that the centrifugal separation and the recovery of the suspension were conducted only once. The volume-cumulative particle size distribution of the seed crystals in Example 2 had a coefficient of variation of 0.37 and a kurtosis of 2.37. That is, the volume-cumulative particle size distribution of the seed crystals in Example 2 had a coefficient of variation of 0.5 or less and a kurtosis of 5 or less. Conditions for producing the zeolite membrane 12 in Example 2 were the same as those in Example 1, except that the seed crystals were different.

In Example 3, a pulverized crystal group and an intermediate crystal group were prepared in accordance with Example 1 of International Publication WO 2010/090049. Thereafter, a liquid prepared by pouring the intermediate crystal group in deionized water to achieve 1 to 10% by mass was subjected to centrifugal separation at 2000 rpm for 20 minutes using a centrifugal separator, so as to recover a suspension in the upper portion of the liquid that had undergone the centrifugal separation. A liquid obtained by conducting the centrifugal separation and the recovery of the suspension twice was dried at 80° C. for 24 hours, and recovered seed crystals were subjected to X-ray diffraction measurement.

The volume-cumulative particle size distribution of the seed crystals in Example 3 had a coefficient of variation of 0.34 and a kurtosis of 2.03. That is, the volume-cumulative particle size distribution of the seed crystals in Example 3 had a coefficient of variation of 0.5 or less and a kurtosis of 5 or less.

In Example 3, the zeolite membrane 12 was produced as follows. First, the seed crystals were deposited on the support 11 by putting the support 11 in contact with a solution in which the aforementioned seed crystals were dispersed. Then, a starting material solution was prepared by dissolving 30% colloidal silica, ethylenediamine, and 1-adamantanamine respectively as a silicon source, an additive, and an SDA in deionized water. The starting material solution had a composition of $1.0SiO_2:0.12(CH_2)_2(NH_2)_2:0.015SDA.$ Then, the support 11 with the seed crystals deposited thereon was immersed in the starting material solution and subjected to hydrothermal synthesis at 135° C. for 16 hours so as to form the zeolite membrane 12 on the support 11. Then, the support 11 with the zeolite membrane 12 formed thereon was rinsed sufficiently with deionized water and dried completely at 100° C. Next, the zeolite membrane complex 1 was obtained by heating the support 11 with the zeolite membrane 12 formed thereon at 450° C. for 50 hours so as to burn and remove the SDA and penetrate pores in the zeolite membrane 12.

Comparative Example 1 used the intermediate crystal group of Example 1 as seed crystals. The volume-cumulative particle size distribution of the seed crystals in Comparative Example 1 had a coefficient of variation of 0.44 and a kurtosis of 5.69. That is, the volume-cumulative particle size distribution of the seed crystals in Comparative Example 1 had a coefficient of variation of 0.5 or less and a kurtosis of greater than 5. Conditions for producing the zeolite membrane 12 in Comparative Example 1 were the same as those in Example 1, except that the seed crystals were different.

Comparative Example 2 used the pulverized crystal group of Example 1 as seed crystals. The volume-cumulative particle size distribution of the seed crystals in Comparative Example 2 had a coefficient of variation of 0.54 and a kurtosis of 5.35. That is, the volume-cumulative particle size distribution of the seed crystals in Comparative Example 2 had a coefficient of variation of higher than 0.5 and a kurtosis of greater than 5. Conditions for producing the zeolite membrane 12 in Comparative Example 2 were the same as those in Example 1, except that the seed crystals were different.

Comparative Example 3 used the pulverized crystal group of Example 3 as seed crystals. The volume-cumulative particle size distribution of the seed crystals in Comparative Example 3 had a coefficient of variation of 0.54 and a kurtosis of 3.18. That is, the volume-cumulative particle size distribution of the seed crystals in Comparative Example 3 had a coefficient of variation of higher than 0.5. Conditions for producing the zeolite membrane 12 in Comparative Example 3 were the same as those in Example 3, except that the seed crystals were different.

In Examples 1 to 3, the $CO_2/CH_4$ permeance ratios in the zeolite membrane complex 1 were respectively 1201, 1024, and 924 and all showed high separation performance. In Comparative Examples 1 to 3, on the other hand, the $CO_2/CH_4$ permeance ratios in the zeolite membrane complex 1 were respectively 893, 806, and 725 and showed lower separation performance than in Examples 1 to 3. That is, the zeolite membranes 12 of Examples 1 to 3 had higher denseness than the zeolite membranes 12 of Comparative Examples 1 to 3.

As described above, the volume-cumulative particle size distributions of the seed crystals of Examples 1 to 3, measured by a laser diffraction scattering method, each had a coefficient of variation of 0.5 or less and a kurtosis of 5 or less. Use of these seed crystals improves the bonding of zeolite crystals when producing the zeolite membrane 12. As a result, a dense zeolite membrane 12 can be formed.

When a zeolite membrane was produced in the same manner as in Example 1 with use of seed crystals acquired so as to have a volume-cumulative particle size distribution having a different coefficient of variation and a different kurtosis by changing, for example, centrifugal separation conditions or synthesis conditions for the intermediate crystal group, it had been confirmed that the denseness of the zeolite membrane was improved with use of seed crystals having a coefficient of variation of 0.5 or less and a kurtosis of 5 or less. Similarly, an increase of the denseness of the zeolite membrane had also been confirmed, not only in the case of the aforementioned SAT-type zeolite, but also in the cases of a DDR-type zeolite that contains Si, a CHA-type zeolite that contains Si and Al, an AFX-type zeolite that contains Si, Al, and P, an AEI-type zeolite that contains Al and P, and an ERI-type zeolite that contains Al and P.

Preferably, the coefficient of variation is 0.4 or less, and the kurtosis is 3 or less. In this case, a denser zeolite membrane 12 can be formed.

As described above, in the X-ray diffraction pattern obtained by X-ray irradiation to the above seed crystals, the intensity of crystalline components at a diffraction angle 2θ at which a maximum peak appears within the range of the diffraction angle 2θ of 12° to 25° is preferably 35 times or more the intensity of amorphous components. In this way, the seed crystals contain less amorphous components and have high crystallinity. Therefore, it is possible to shorten the time required to form the zeolite membrane 12 by hydrothermal synthesis. As a result, productivity of the zeolite membrane complex 1 can be improved.

As described above, the seed crystals have a specific surface area of 10 m²/g or more and 150 m²/g or less. Thus, the seed crystals can be densely deposited on the support 11.

As described above, the support 11 is preferably porous. In this case, the zeolite membrane complex 1 can use the zeolite membrane 12 as a separation membrane (e.g., gas separation membrane) and can favorably separate a mixture of substances with use of the zeolite membrane 12.

As described above, the 50% diameter of the volume-cumulative particle size distribution of the seed crystals is preferably 1.1 times or more and 5 times or less the 50% diameter of the volume-cumulative pore size distribution of the support 11. By making the particle diameter of the seed crystals larger than the pore diameter of the support 11, it is possible to suppress the entry of the seed crystals into the pores of the support 11 when depositing the seed crystals on the support 11. As a result, the growth of the zeolite membrane 12 inside the support 11 can be suppressed.

As described above, the support 11 is preferably an alumina sintered compact or a mullite sintered compact.

This further improves the adhesion properties of the seed crystals on the support 11 and allows the zeolite membrane 12 to be formed favorably on the support 11.

The method of producing the above-described seed crystals includes the step of synthesizing an original crystal group of zeolite by hydrothermal synthesis and acquiring an intermediate crystal group from the original crystal group (step S12), and the step of acquiring a crystal group as seed crystals from the intermediate crystal group, the crystal group being determined to have a volume-cumulative particle size distribution having a coefficient of variation of 0.5 or less and a kurtosis of 5 or less, the volume-cumulative particle size distribution being measured by the laser diffraction scattering method (step S13). Accordingly, the aforementioned seed crystals can be produced with ease.

In step 13 of the method of producing seed crystals, the seed crystals are preferably a crystal group extracted from the intermediate crystal group. By so doing, the aforementioned seed crystals with a coefficient of variation of 0.5 or less and a kurtosis of 5 or less can be acquired with ease.

In step S13, more preferably, the seed crystals are extracted by classification of the intermediate crystal group by centrifugal separation. This shortens the time required to extract seed crystals than in cases where seed crystals are extracted by leaving a liquid that contains the intermediate crystal group at rest.

As described above, step S12 preferably includes the step of synthesizing the original crystal group by hydrothermal synthesis (step S121), the step of pulverizing the original crystal group (step S122), and a step of acquiring the intermediate crystal group by recrystallization of the original crystal group pulverized in step S122 (step S123). This suppresses the spread of the particle size distribution of the intermediate crystal group and improves the acquisition rate of seed crystals (i.e., recovery rate of seed crystals) from the original crystal group. Besides, the time required to produce the zeolite membrane 12 can be shortened because the obtained seed crystals have high crystallinity.

The method of producing the aforementioned zeolite membrane complex 1 includes the step of preparing the support 11 (step S11), the step of producing a seed-crystal-deposited support by depositing seed crystals produced by the aforementioned method of producing zeolite seed crystals (steps S12 and S13) on the support 11 (step S14), and the step of forming the zeolite membrane 12 on the support 11 by immersing the seed-crystal-deposited support in a starting material solution and growing zeolite from the seed crystals by hydrothermal synthesis (step S15). Accordingly, the zeolite membrane complex 1 including the dense zeolite membrane 12 can be obtained.

The aforementioned separation method includes the step of preparing the zeolite membrane complex 1 produced by the aforementioned production method (step S21), and the step of supplying a mixture of substances including a plurality of types of gases or liquids to the zeolite membrane complex 1 and causing a high-permeability substance in the mixture of substances to permeate through the zeolite membrane complex 1 so as to separate the high-permeability substance from the other substances (step S22). As described above, the zeolite membrane complex 1 has high permeability and high separation performance and accordingly can efficiently separate a mixture of substances by this separation method.

This separation method is in particular suitable for use in separating a mixture of substances including at least one of the following substances: hydrogen, helium, nitrogen, oxygen, water, steam, carbon monoxides, carbon dioxides, nitrogen oxides, ammonia, sulfur oxides, hydrogen sulfides, hydrogen fluorides, mercury, arsine, hydrocyanic acids, carbonyl sulfides, C1 to C8 hydrocarbons, organic acids, alcohol, mercaptans, ester, ether, ketone, and aldehyde.

The seed crystals, the method of producing the seed crystals, the method of producing the zeolite membrane complex 1, and the separation method described above may be modified in various ways.

For example, in the X-ray diffraction pattern obtained by X-ray irradiation to seed crystals, the intensity of crystalline components at a diffraction angle $2\theta$ at which a maximum peak appears within a range of the diffraction angle $2\theta$ of $12°$ to $25°$ may be less than 35 times the intensity of amorphous components.

The specific surface area of the seed crystals may be less than 10 $m^2/g$, or may be greater than 150 $m^2/g$.

The 50% diameter of the volume-cumulative particle size distribution of the seed crystals may be less than 1.1 times or greater than 5 times the 50% diameter of the volume-cumulative pore size distribution of the support 11.

In the aforementioned method of producing seed crystals, the acquisition of the intermediate crystal group in step S12 may be implemented by a different method other than the method illustrated in steps S121 to S123. For example, the recrystallization in step S123 may be omitted. The extraction of seed crystals from the intermediate crystal group in step S13 may be implemented by a different method other than the aforementioned centrifugal separation and still standing.

The structure and material of the support 11 in the zeolite membrane complex 1 may be other than those described above.

The zeolite membrane complex 1 may further include a functional membrane or a protective membrane laminated on the zeolite membrane 12, in addition to the support 11 and the zeolite membrane 12. Such a functional or protective membrane may be an inorganic membrane such as a zeolite membrane, a silica membrane, or a carbon membrane, or may be an organic membrane such as a polyimide membrane or a silicone membrane. Alternatively, a substance that can easily adsorb specific molecules such as $CO_2$ may be added to the functional or protective membrane laminated on the zeolite membrane 12.

The separator 2 and the separation method may separate substances other than those given as examples in the above description from a mixture of substances.

The configurations of the preferred embodiments and variations described above may be appropriately combined as long as there are no mutual inconsistencies.

While the invention has been shown and described in detail, the foregoing description is in all aspects illustrative and not restrictive. It is therefore understood that numerous modifications and variations can be devised without departing from the scope of the invention.

INDUSTRIAL APPLICABILITY

The seed crystals according to the present invention can be used in, for example, the production of a zeolite membrane complex that is used as a gas separation membrane. The seed crystals can also be used in the production of a zeolite membrane complex that is used as a separation membrane for substances other than gases or as an adsorbent membrane for various substances.

REFERENCE SIGNS LIST

1 Zeolite membrane complex
11 Support

12 Zeolite membrane
S11 to S16, S21 to S22 Step

The invention claimed is:

1. A zeolite seed crystal that is to be deposited on a support when producing a zeolite membrane complex that includes said support and a zeolite membrane formed on said support,
a volume-cumulative particle size distribution of said zeolite seed crystal, measured by a laser diffraction scattering method, having a coefficient of variation of 0.5 or less and a kurtosis of 5 or less.

2. The zeolite seed crystal according to claim 1, wherein
said coefficient of variation is 0.4 or less, and
said kurtosis is 3 or less.

3. The zeolite seed crystal according to claim 1, wherein
in an X-ray diffraction pattern obtained by X-ray irradiation to said seed crystal, an intensity of a crystalline component at a diffraction angle $2\theta$ at which a maximum peak appears within a range of the diffraction angle $2\theta$ of 12° to 25° is 35 times or more an intensity of an amorphous component.

4. The zeolite seed crystal according to claim 1, wherein said zeolite seed crystal has a specific surface area of 10 $m^2/g$ or more and 150 $m^2/g$ or less.

5. The zeolite seed crystal according to claim 1, wherein said support is porous.

6. The zeolite seed crystal according to claim 5, wherein a 50% diameter of said volume-cumulative particle size distribution is 1.1 times or more and 5 times or less a 50% diameter of a volume-cumulative pore size distribution of said support.

7. The zeolite seed crystal according to claim 1, wherein said support is an alumina sintered compact or a mullite sintered compact.

8. A method of producing a zeolite seed crystal that is to be deposited on a support when producing a zeolite membrane complex that includes said support and a zeolite membrane formed on said support, the method comprising:
operation a) synthesizing an original crystal group of zeolite by hydrothermal synthesis and acquiring an intermediate crystal group from said original crystal group; and
operation b) acquiring a crystal group as seed crystals from said intermediate crystal group, the crystal group being determined to have a volume-cumulative particle size distribution having a coefficient of variation of 0.5 or less and a kurtosis of 5 or less, the volume-cumulative particle size distribution being measured by a laser diffraction scattering method.

9. The method of producing a zeolite seed crystal according to claim 8, wherein
in said operation b), said seed crystals are a crystal group extracted from said intermediate crystal group.

10. The method of producing a zeolite seed crystal according to claim 9, wherein
in said operation b), said seed crystals are extracted by classification of said intermediate crystal group by centrifugal separation.

11. The method of producing a zeolite seed crystal according to claim 8, wherein
said operation a) includes:
operation a1) synthesizing said original crystal group by hydrothermal synthesis;
operation a2) pulverizing said original crystal group; and
operation a3) acquiring said intermediate crystal group by recrystallization of said original crystal group pulverized in said operation a2).

12. A method of producing a zeolite membrane complex, comprising:
d) preparing a support;
e) producing a seed-crystal-deposited support by depositing seed crystals produced by the method of producing a zeolite seed crystal according to claim 8 on said support; and
f) immersing said seed-crystal-deposited support in a starting material solution and growing zeolite from said seed crystals by hydrothermal synthesis to form a zeolite membrane on said support.

13. A separation method comprising:
g) preparing a zeolite membrane complex produced by the method of producing a zeolite membrane complex according to claim 12; and
h) supplying a mixture of substances including a plurality of types of gases or liquids to said zeolite membrane complex and allowing a high-permeability substance in said mixture of substances to permeate through said zeolite membrane complex to separate said high-permeability substance from other substances.

14. The separation method according to claim 13, wherein said mixture of substances includes at least one of following substances: hydrogen, helium, nitrogen, oxygen, water, steam, carbon monoxides, carbon dioxides, nitrogen oxides, ammonia, sulfur oxides, hydrogen sulfides, sulfur fluorides, mercury, arsine, hydrocyanic acids, carbonyl sulfides, C1 to C8 hydrocarbons, organic acids, alcohol, mercaptans, ester, ether, ketone, and aldehyde.

* * * * *